United States Patent
Mateo

(10) Patent No.: US 9,739,686 B2
(45) Date of Patent: Aug. 22, 2017

(54) TOOL COMPRISING AT LEAST ONE SEALING DEVICE FOR AN OPENING

(71) Applicant: Airbus Operations (S.A.S.), Toulouse (FR)

(72) Inventor: Stéphane Mateo, Dieupentale (FR)

(73) Assignee: Airbus Operations (S.A.S.), Toulouse (FR)

( * ) Notice: Subject to any disclaimer, the term of this patent is extended or adjusted under 35 U.S.C. 154(b) by 273 days.

(21) Appl. No.: 14/560,687

(22) Filed: Dec. 4, 2014

(65) Prior Publication Data

US 2015/0160094 A1 Jun. 11, 2015

(30) Foreign Application Priority Data

Dec. 6, 2013 (FR) .................................. 13 62247

(51) Int. Cl.
*G01M 15/14* (2006.01)
*F16L 55/168* (2006.01)
*G01M 15/02* (2006.01)

(52) U.S. Cl.
CPC ........... *G01M 15/02* (2013.01); *F16L 55/168* (2013.01); *G01M 15/14* (2013.01); *Y10T 137/598* (2015.04)

(58) Field of Classification Search
CPC ............................. G01M 15/02; F16L 55/168
USPC .................................................. 73/49.1, 49.8
See application file for complete search history.

(56) References Cited

U.S. PATENT DOCUMENTS

| | | | |
|---|---|---|---|
| 1,467,813 A * | 9/1923 | Rahm | G01M 3/2846 73/49.8 |
| 2,123,105 A | 7/1938 | Gerson | |
| 3,076,330 A * | 2/1963 | Bushell | G01M 3/04 73/40 |
| 3,433,079 A * | 3/1969 | Wilson | G01M 3/3209 138/90 |
| 4,047,423 A * | 9/1977 | Eason | G01M 3/26 116/271 |
| 5,275,013 A | 1/1994 | Price | |
| 5,375,458 A * | 12/1994 | Oliver | G01M 3/2853 376/250 |
| 6,253,599 B1 * | 7/2001 | Chang | G01N 3/12 285/323 |
| 8,020,575 B1 | 9/2011 | Watson | |

FOREIGN PATENT DOCUMENTS

FR 2988086 9/2013

OTHER PUBLICATIONS

Frence Search Report for Application No. FR 1362247 dated Sep. 4, 2014.

* cited by examiner

*Primary Examiner* — John Fitzgerald
(74) *Attorney, Agent, or Firm* — Jenkins, Wilson, Taylor & Hunt, P.A.

(57) ABSTRACT

A tool for sealing at least one opening of a fluid circuit element, the tool including a support, at least one sealing device for an opening connected to the support and positioning structure for positioning and immobilizing the support with respect to the fluid circuit element, the frame comprising a U-shaped stirrup with a base and two arms, a rod and two connections connecting the rod to each arm, each arm including a centering wedge attached to the internal face of the arm which presents a bearing surface, the bearing surfaces being spaced apart by a distance making it possible to immobilize the fluid circuit element in a first direction in a transverse plane.

12 Claims, 4 Drawing Sheets

TOOL COMPRISING AT LEAST ONE SEALING DEVICE FOR AN OPENING

CROSS-REFERENCE TO RELATED APPLICATION

This application claims priority to FR 13 62247 filed Dec. 6, 2013, the entire disclosure of which is incorporated by reference herein.

TECHNICAL FIELD

The present disclosure relates to a tool comprising at least one sealing device for an opening.

BACKGROUND

During aircraft assembly, it is necessary to test the sealing of certain elements, such as the fuel circuits.

As is known, a fuel circuit consists of various elements such as reservoirs, ducts, pumps, valves or other elements. Some of these elements comprise openings which open outwards. This is in particular the case of the maintenance valves which are fitted to the fuel pump bodies and which comprise pressure tapping points which connect the interior of the valve with the exterior.

During sealing tests, these openings generate parasitic leaks which make it difficult to detect other leaks, in particular in a confined space.

Document FR-2.988.086 proposes a sealing device by means of which it is possible to seal an opening during a sealing test. This sealing device comprises a body carrying an end piece which is mobile with respect to the body, and a seal supported by the free end of the end piece. According to this document, the sealing device is mounted on a bracket attached by screws to a support secured to the structure of the aircraft.

Even if this sealing device is satisfactory, use thereof requires particular adaptations such as tapped holes on the element of the circuit or on a support secured to the structure of the aircraft. In certain cases, there is no means for securing the bracket which supports the attachment device to the structure of the aircraft or to the element of the circuit.

SUMMARY

Thus, the present application aims to remedy the drawbacks of the prior art. To that end, the disclosure relates to a tool for sealing at least one opening of a fluid circuit element, the tool comprising a support in the form of a frame with at least one removable part to allow the frame to be placed around the fluid circuit element, at least one sealing device for an opening connected to the support and positioning structure for positioning and immobilizing the support with respect to the fluid circuit element. According to the disclosure, the frame comprises a U-shaped stirrup with a base and two arms, a rod and two connections connecting the rod to each arm, each arm comprising a centering wedge attached to the internal face of the arm which presents a bearing surface, the bearing surfaces being spaced apart by a distance making it possible to immobilize the fluid circuit element in a first direction in a transverse plane.

This solution has the advantage of not requiring particular adaptations such as tapped holes in the fluid circuit element or in the structure of the aircraft for positioning and immobilizing the support.

At least one of the two arms can be articulated with respect to the base.

Advantageously, the tool comprises at least one clamping system which brings the rod closer to the base. This configuration has an advantage of using the frame itself to clamp the fluid circuit element.

The tool can comprise two clamping systems provided at each end of the rod. This configuration makes it possible to obtain a better distribution of forces.

According to one embodiment, a clamping system comprises a stem which extends in a direction parallel to the length of the arms, with at a first end a first stop which bears against the external surface of the rod and at a second end a second stop which bears against a part of the frame or an element secured to the frame, at least one of the first and second stops being mobile in the direction of the stem.

Advantageously, for each centering wedge, the bearing surface is extended by an inclined edge face, the inclined edge faces forming a shape which widens towards the free ends of the arms. This solution simplifies the positioning of the frame with respect to the fluid circuit element.

According to another feature, the bearing surface can comprise two ribs which project with respect to the bearing surface and are oriented in a direction parallel to the length of the arms, the ribs being separated by a distance making it possible to immobilize the fluid circuit element in a longitudinal direction.

Advantageously, the tool comprises a bearing wedge attached to the internal face of the base.

In one aspect, the rod supports a seal for sealing an opening. This configuration makes it possible, during clamping, to simultaneously immobilize the frame with respect to the fluid circuit element and seal an opening by the seal supported by the rod.

For each sealing device, the frame comprises a through hole whose axis is aligned with that of an opening when the tool is mounted on the fluid circuit element.

According to one embodiment, a sealing device comprises a threaded stem which is screwed into a tapped through hole created in the frame, a seal, and a support interposed between the threaded stem and the seal, the seal being attached to the support, the support being able to pivot with respect to the threaded stem.

In one aspect, the tool comprises a connector which provides a permanent connection between the rod and the stirrup.

BRIEF DESCRIPTION OF THE DRAWINGS

Other features and advantages will become clear from the following description of the disclosure, which description is given purely by way of example and with reference to the appended drawings, in which.

DETAILED DESCRIPTION

For the remainder of the description, a fluid circuit element is to be understood as any element able to channel a fluid, such as a duct, a valve or a pump.

A longitudinal direction corresponds to the flow direction of the fluid. In the case of a circuit portion in the form of a hollow cylindrical tube, the longitudinal direction corresponds to the axis of the tube.

A longitudinal plane corresponds to a plane containing the longitudinal direction.

A transverse plane corresponds to a plane perpendicular to the longitudinal direction.

By way of example, in FIGS. 1, 2, 3, 6, 7 and 8, the fluid circuit element 10, 110 corresponds to a maintenance valve fitted to a fuel pump body of an aircraft.

Figure 1:
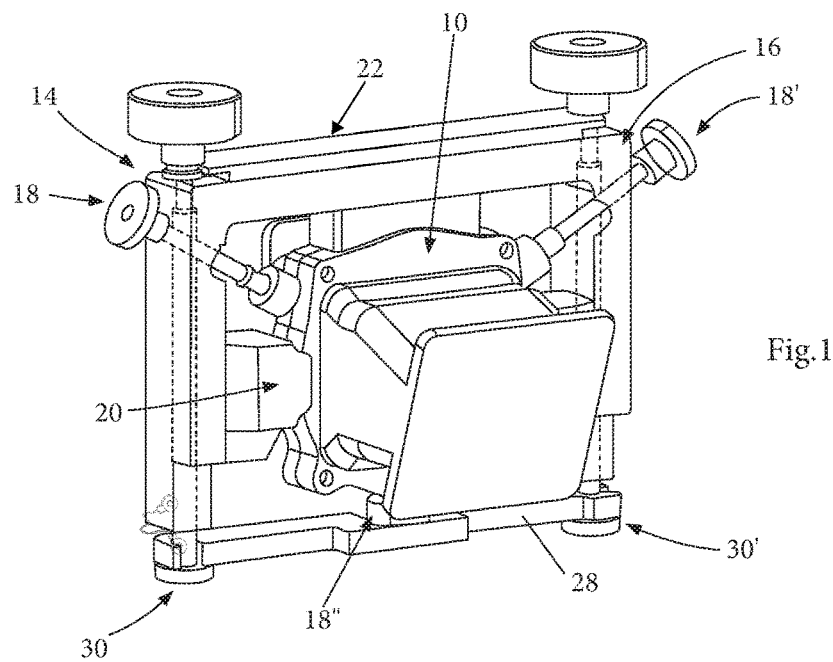
FIG. 1 is a perspective view of a tool supporting three sealing devices and mounted on a fluid circuit element which illustrates a first variant of the disclosure.
Figure 2:
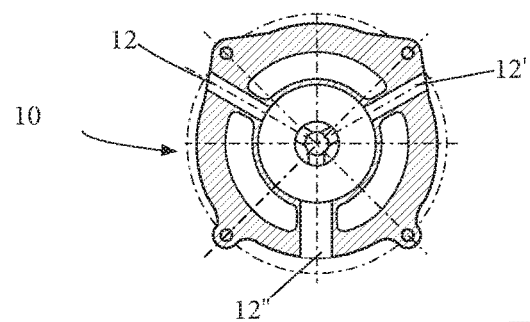
FIG. 2 is a cross section of the circuit element illustrated in FIG. 1.
Figure 3:
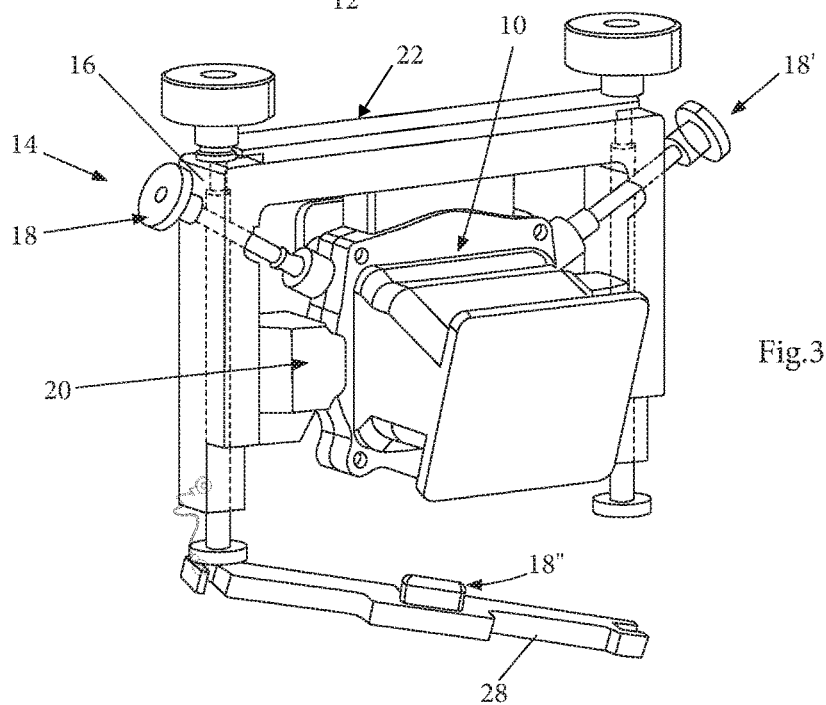
FIG. 3 is a perspective view of the tool illustrated in FIG. 1 during mounting.

According to a first embodiment illustrated in FIGS. 1 to 3, the fluid circuit element 10 comprises three openings 12, 12' and 12" which connect the interior of the fluid circuit element with the exterior, whose axes are arranged in a transverse plane. The first and second openings 12 and 12' are of circular cross section. The third opening 12" is of oblong cross section whose larger dimension is oriented in a direction perpendicular to the longitudinal direction. The first and second openings 12 and 12' are respectively arranged at 10 o'clock and 2 o'clock whereas the third opening 12" is arranged at 6 o'clock.

Figure 6:
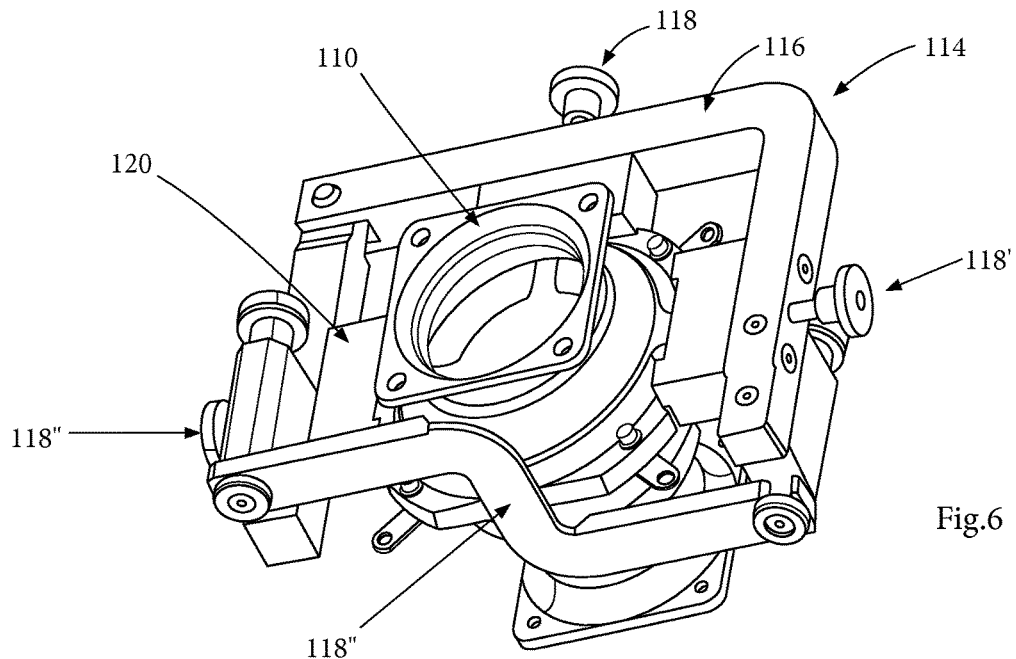
FIG. 6 is a perspective view of a tool supporting four sealing devices and mounted on a fluid circuit element which illustrates a second variant of the disclosure.
Figure 7:
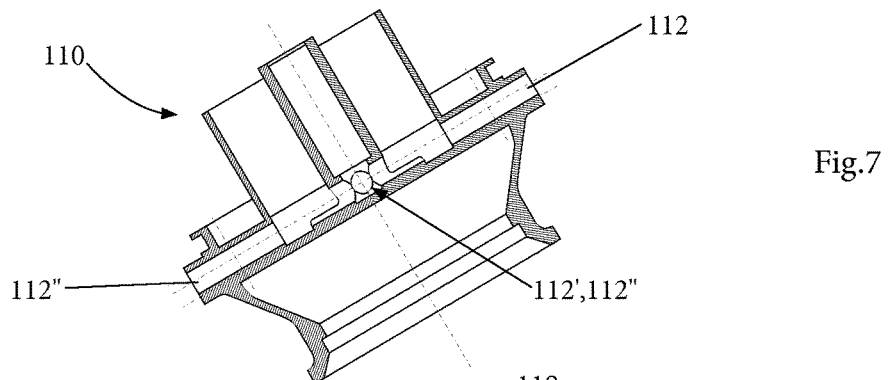
FIG. 7 is a cross section of the circuit element illustrated in FIG. 6.
Figure 8:
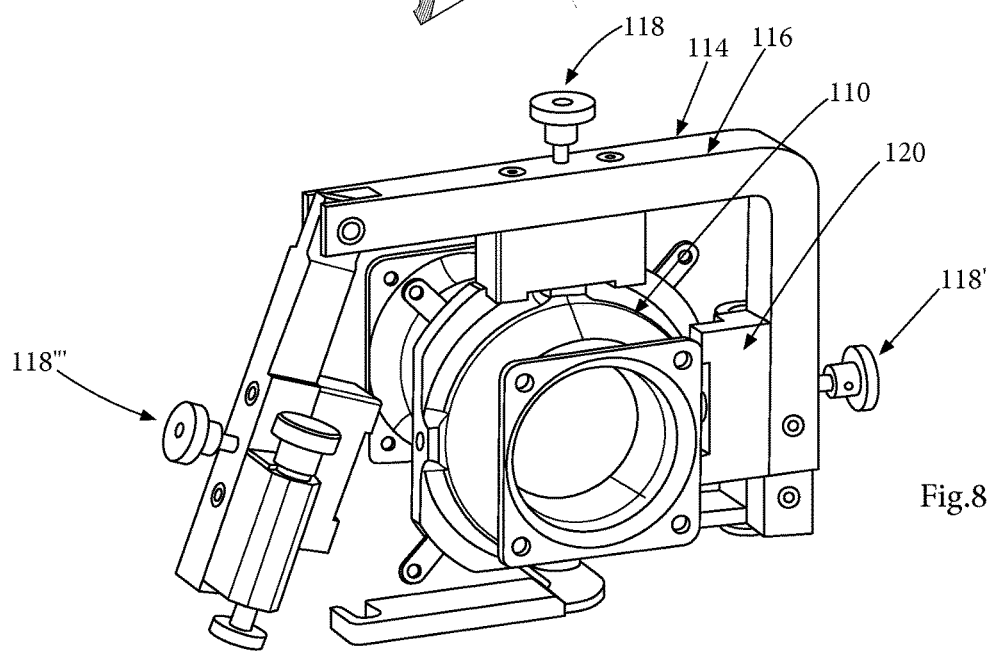
FIG. 8 is a perspective view of the tool illustrated in FIG. 6 during mounting.

According to a second embodiment illustrated in FIGS. 6 to 8, the fluid circuit element 110 comprises four openings 112, 112', 112", 112''' which connect the interior of the fluid circuit element with the exterior, whose axes are arranged in a transverse plane. The openings 112, 112', 112", 112''' are of circular cross section and are arranged respectively at 12 o'clock, 3 o'clock, 6 o'clock and 9 o'clock.

Of course, the disclosure is not limited to these fluid circuit elements. Thus, the disclosure may be suitable for all fluid circuit elements 10 comprising at least one opening 12 connecting the interior of the fluid circuit element with the exterior.

For sealing at least one opening 12, 112, use is made of a tool 14, 114 which comprises a support, at least one sealing device 18, 118 connected to the support and positioning structure 20, 120 for positioning and immobilizing the support with respect to the circuit element 10, 110.

According to the disclosure, the positioning structure 20, 120 for positioning and immobilizing the support comprises at least one clamping system able to clamp at least one part of the fluid circuit element. This solution has an advantage of not requiring particular adaptations such as tapped holes in the fluid circuit element or in the structure of the aircraft for positioning and immobilizing the support.

Advantageously, the support is in the form of a frame 16, 116 which surrounds the fluid circuit element 10, 110. This solution is more compact. According to another advantage, as will be explained herein below, certain parts of the frame are used to clamp the fluid circuit element.

For the remainder of the description, a surface or a face is the to be internal if it is oriented towards the interior of the frame towards the circuit element. A surface or a face is the to be external if it is oriented towards the exterior of the frame.

According to a first variant illustrated in FIGS. 1, 3, 4, 5A and 5B, the frame 16 comprises a U-shaped stirrup 22 with a base 24 and two arms 26, 26', a rod 28 and two connections 30, 30' connecting the rod 28 to the free end of each arm 26, 26'.

Advantageously, at least one of the two connections 30, 30' is removable such that the frame 16 can be placed around the fluid circuit element 10.

According to one embodiment, the rod comprises an internal face 28I and an external face 28E and at a first end 32 a U-shaped notch 34 oriented in a direction parallel to the length of the rod 28 and at a second end 32' a U-shaped notch 34' oriented in the longitudinal direction. The two notches 34, 34' extend between the internal face 28I and the external face 28E.

In addition, each arm 26, 26' supports a stem 36, 36' of which one segment is able to be received in the notches 34, 34'.

According to the disclosure, the frame 16 comprises at least one clamping system 38 which brings the rod 28 closer to the base 24 of the stirrup 22 so as to immobilize the frame 16 with respect to the fluid circuit element 10. For preference, the frame 16 comprises two clamping systems 38, 38' provided at each end of the rod 28 which also act as connections 30, 30' between the free ends of the rod 28 and the ends of the arms 26, 26'. This configuration makes it possible to reduce the number of parts.

For the remainder of the description, only one clamping system will be described, the other being identical.

Figure 4:
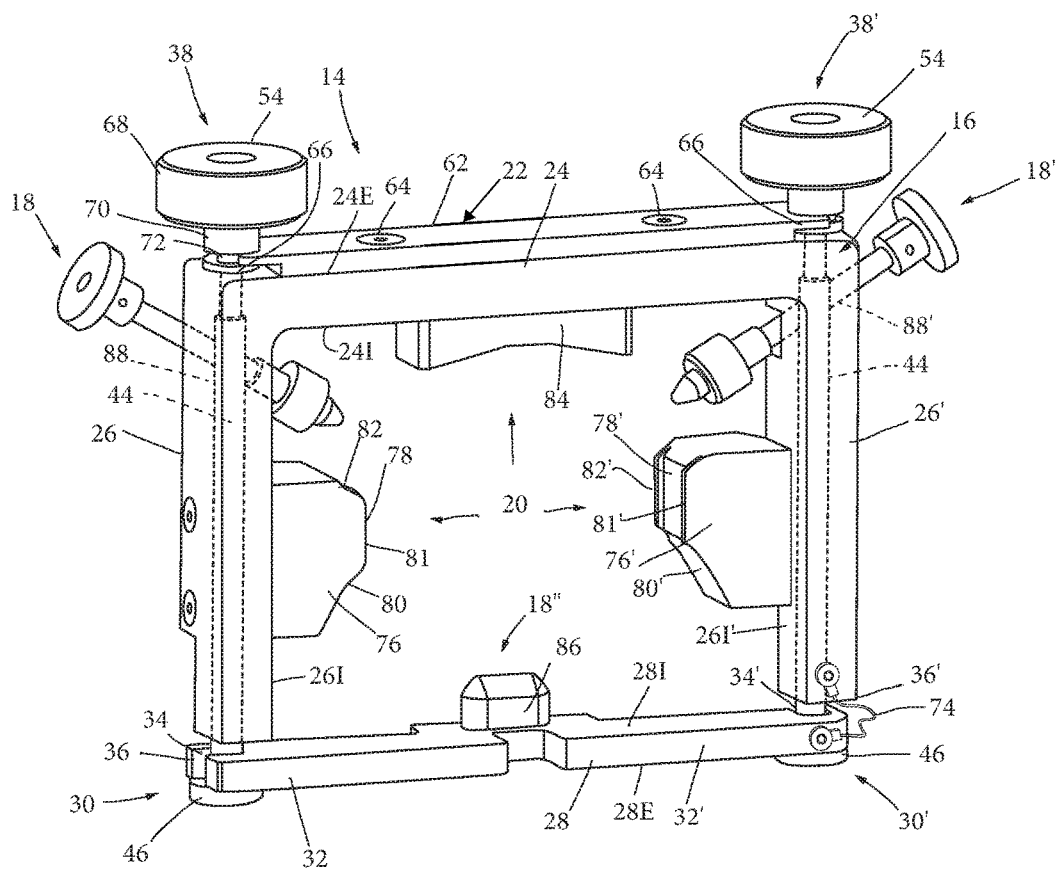
FIG. 4 is a perspective view of the tool illustrated in FIG. 1 without a circuit element.
Figures 5A, 5B:
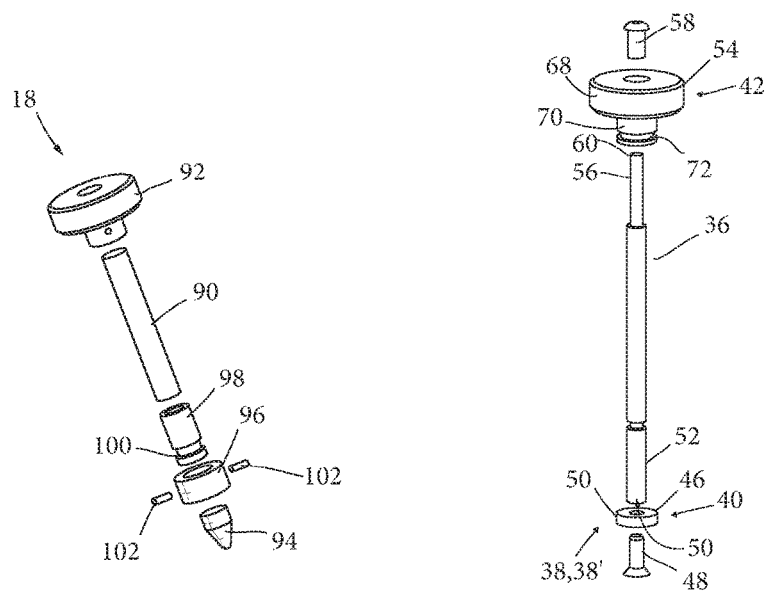
FIG. 5A is a perspective view of a sealing device which illustrates an embodiment of the disclosure.
FIG. 5B is a perspective view of a clamping system which illustrates an embodiment of the disclosure.

According to one embodiment illustrated in detail in FIGS. 4 and 5A, each clamping system 38 comprises the stem 36 parallel to the arms, and first and second stops 40, 42 provided at the ends of the stem 36, at least one of these being mobile in the direction of the stem 36.

Each arm 26, 26' comprises a through hole 44 for accommodating the stem 36, wherein the through hole 44 extends over the entire length of the arm 26 and opens at a first end at the free end of the arm and at a second end at the external surface 24E of the base 24.

The first stop 40 comprises a retaining washer 46 mounted on the stem 36 and a screw 48 which is screwed into a tapped hole 50 created at a first end 52 of the stem 36. Once the frame is assembled, the retaining washer 46 bears against the external surface 28E of the rod 28.

The second stop 42 comprises a knurled knob 54 with a smooth hole through which passes a second end 56 of the stem 36. Once the frame is assembled, the knurled knob 54 bears directly or indirectly against the external surface 24E of the base 24 of the stirrup 22.

The clamping system 38, 38' comprises a screw 58 which is screwed into a tapped hole 60 created at the second end 56 of the stem 36.

According to this configuration, screwing or unscrewing the screw 58 and/or the screw 48 tightens and loosens the clamping system 38, 38'.

Advantageously, the frame 16 comprises at least one centering shim 62 for positioning and holding the knurled knobs 54. As illustrated in FIG. 4, the centering shim 62 is in the form of a bar clamped and secured to the external surface 24E of the base 24 of the stirrup, for example with the aid of two screws 64. The centering shim 62 comprises at each of its ends a flange 66 which is offset with respect to the external surface 24E, each of which has a U-shaped notch oriented in a direction parallel to the length of the centering shim 62. In addition, the knurled knob 54 comprises two stepped cylinders, an upper cylinder 68 with a knurled peripheral surface and a lower cylinder 70 with a diameter smaller than that of the upper cylinder 68. The lower cylinder 70 comprises a peripheral channel 72. According to this arrangement, the width of the U-shaped notch of each flange 66 of the shim is greater than the diameter of the base of the peripheral channel 72 and less than the diameter of the lower cylinder 70. Thus, for each knurled knob 54, the edges of the U-shaped notch of the flange 66 of the centering shim 62 are accommodated in the peripheral channel 72 of the knurled knob 54 and are thus held.

Advantageously, the tool comprises a connector 74 which provides a permanent connection between the rod 28 and the stirrup 22 even when the connections 30, 30' no longer connect the rod 28 to the stirrup 22. This connector 74 comprises a cable with at each of its ends an eye. Each eye can be secured by a screw respectively to the stirrup 22 and to the rod 28.

The positioning structure 20 for positioning and immobilizing the frame 16 immobilize the frame 16 with respect to the fluid circuit element 10 in a transverse plane. Advantageously, in addition to immobilizing the frame in a transverse plane, the positioning structure 20 for positioning and immobilizing the frame immobilize the frame 16 with respect to the fluid element 10 in the longitudinal direction.

According to one embodiment, the distance between the arms 26, 26' can be adjusted to the dimensions of the fluid circuit element 10 so as to immobilize the frame in a transverse plane.

Advantageously, each arm 26, 26' comprises a centering wedge 76, 76' attached to its internal face 261, 261'.

Each centering wedge 76, 76' comprises a bearing surface 78, 78', the bearing surfaces 78, 78' being simultaneously in contact with the fluid circuit element 10 so as to immobilize the latter in a first direction, corresponding in the figures to the direction parallel to the length of the base 24. To that end, the distance between the bearing surfaces 78, 78' is substantially equal to the dimension of that part of the fluid circuit element 10 which bears against the bearing surfaces 78, 78'.

For each centering wedge, the bearing surface 78, 78' can be extended by an inclined edge face 80, 80', the inclined edge faces 80, 80' forming a shape which widens towards the free ends of the arms 26, 26' so as to facilitate centering and placement of the stirrup 22.

Advantageously, each bearing surface 78 (78') comprises two ribs 81 (81') and 82 (82') which project with respect to the bearing surface 78 (78') and are oriented in the direction corresponding to the length of the arms 26, 26', the ribs 81, 82 being separated by a distance making it possible to immobilize the frame with respect to the fluid circuit element in the longitudinal direction. To that end, the distance between the ribs 81, 82 is substantially equal to the dimension of that part of the fluid element in contact with the bearing surfaces 78, 78', in the longitudinal direction.

For preference, the positioning structure 20 for positioning and immobilizing the frame 16 comprise, in addition to the centering wedges 76, 76', a bearing wedge 84 attached to an internal face 241 of the base 24 of the stirrup 22.

The bearing wedge 84 comprises a bearing surface whose shapes are adapted to those of the fluid circuit element. According to one embodiment, the bearing wedge 84 comprises a widened V shape.

Advantageously, the centering wedges 76, 76' and the bearing wedge 84 are made of a material which limits the risk of damage to the fluid circuit element 10. According to one embodiment, the wedges 76, 76' and 84 are made of polyacetal.

In the case of a fluid circuit element 10 comprising three openings 12, 12' and 12" distributed according to the arrangement described previously and illustrated in FIG. 2, the tool 14 comprises three sealing devices 18, 18' and 18" by which it is possible to seal, respectively, the openings 12, 12' and 12", supported respectively by the first arm 26, the second arm 26' and the rod 28.

According to one embodiment, the sealing device 18" comprises a seal 86 whose cross section matches that of the opening 12" which is secured to the rod 28. The seal 86 is positioned on the rod 28 so as to be aligned with the opening 12". The seal 86 is of oblong cross section which reduces at its distal end in order to improve sealing and such that the seal 86 is self-centering in the opening 12".

According to one embodiment, the rod 28 comprises a recess in which the seal 86 is embedded.

Depending on the configurations, the rod 28 may be not straight and may for example be hat-shaped (visible in FIG. 4) so as to position the seal 86 in line with the opening 12".

The clamping system(s) 38, 38' make(s) it possible to exert a force which clamps the seal 86 against the perimeter of the opening 12" so as to ensure a satisfactory seal.

With regard to the sealing devices 18, 18', each arm 26, 26' comprises a through hole 88, 88' which is tapped and whose axis is aligned with that of the opening 12, 12' when the tool is mounted on the fluid circuit element 10.

A sealing device 18 is illustrated in detail in FIG. 5A. The sealing device 18' is identical.

According to one embodiment, a sealing device comprises a threaded stem 90 which is screwed into a tapped through hole 88 or 88' created in the frame, with at a first end a knurled knob 92 and at a second end a seal 94.

The seal 94 is of circular cross section which reduces at its distal end so as to improve sealing and such that the seal 94 is self-centering in the opening 12 or 12'.

According to one embodiment, the seals 86 and 94 are made of a deformable material such as an elastomer.

According to one assembly form, the knurled knob 92 is screwed onto the threaded stem 90 and a pin is provided to immobilize it with respect to the threaded stem 90.

Advantageously, a support 96 is interposed between the threaded stem 90 and the seal 94, the support 96 being able to pivot with respect to the threaded stem 90. Thus, when screwing the threaded stem 90 in order to clamp the seal 94 against the perimeter of the opening 12 or 12', the seal 94 does not pivot with respect to the perimeter, thus reducing wear of the seal.

According to one embodiment, the seal 94 is adhesively bonded to the support 96.

According to one embodiment, the threaded stem 90 comprises at its end an end cap 98 which is screwed onto the threaded stem 90 and immobilized with respect to the latter. This end cap 98 comprises a peripheral channel 100. In addition, the support 96 comprises a cylindrical recess in which the end cap 98 is accommodated. The support 96 also comprises at least one through opening in which a pin 102 is accommodated, wherein one end of this pin is accommodated in the peripheral channel 100 of the end cap. Advantageously, the support 96 comprises two diametrically opposite openings in which two pins 102 are accommodated.

The operation of the tool 14 is described for example with reference to FIGS. 1 and 3.

In a first instance, the stirrup 22 is placed onto the fluid circuit element 10 until the bearing wedge 84 bears against the fluid circuit element 10. The shapes of the centering wedges 76, 76' facilitate this placement. In this configuration, the stirrup 22 is positioned with respect to the fluid circuit element 10. Then, the rod 28 is connected to the free ends of the arms 26, 26'. The orientation of the notches 34, 34' makes it easier to mount the rod 28 and makes this possible without having to remove the stems 36.

Then, the clamping systems 38, 38' are tightened such that the frame is positioned and immobilized with respect to the fluid element and such that the seal 86 correctly seals the opening 12". For preference, the two clamping systems 38, 38' are tightened simultaneously.

Finally, by screwing the threaded stems 90, the seals 94 are clamped against the perimeter of the openings 12, 12' so as to seal them.

Since the openings 12, 12', 12" are of relatively small cross section, the compressive force on the seals 86, 94 necessary to obtain a satisfactory seal is relatively small.

According to a second variant illustrated in FIGS. 6, 8, 9 and 10, the frame 116 comprises a U-shaped stirrup 122 with a base 124 and two arms 126, 126', a rod 128 and two connections 130, 130' connecting the rod to the free end of each arm 126, 126'.

One difference with respect to the first variant is that at least one of the arms is articulated with respect to the base 124. According to one embodiment, the upper end of the arm 126 can pivot with respect to the base 124, about an axis of rotation A126 parallel to the longitudinal direction (visible in FIG. 9).

As for the first variant, at least one of the two connections 130, 130' is removable such that it is possible to place the frame 116 around the fluid circuit element 110.

According to one embodiment, the rod 128 comprises an internal face 128I and an external face 128E and at a first end 132 a U-shaped notch 134 oriented in the longitudinal direction and at a second end 132' a U-shaped notch 134' oriented in the longitudinal direction. The two notches 134, 134' extend between the internal face 128I and the external face 128E.

In addition, each arm 126, 126' supports a stem 136, 136' of which one segment can be accommodated in the notches 134, 134'.

Advantageously, the frame 116 comprises at least one clamping system 138 which brings the rod 128 closer to the base 124 of the stirrup 122 so as to immobilize the frame 116 with respect to the fluid circuit element 110. The frame 116 in one aspect comprises two clamping systems 138, 138' which are provided at each end of the rod 128 and which also act as connections 130, 130' between the ends of the rod 128 and the free ends of the arms 126, 126'. This configuration makes it possible to reduce the number of parts.

For the remainder of the description, only one clamping system will be described, the other being identical.

For the remainder of the description, a front face or surface corresponds to a face or a surface in a transverse plane oriented in a first sense and a rear face or surface corresponds to a face or a surface in a transverse plane oriented in a second sense counter to the first sense.

Each arm 126 (126') comprises a front face 126Av (126Av') and a rear face 126Ar (126Ar').

Figure 9:
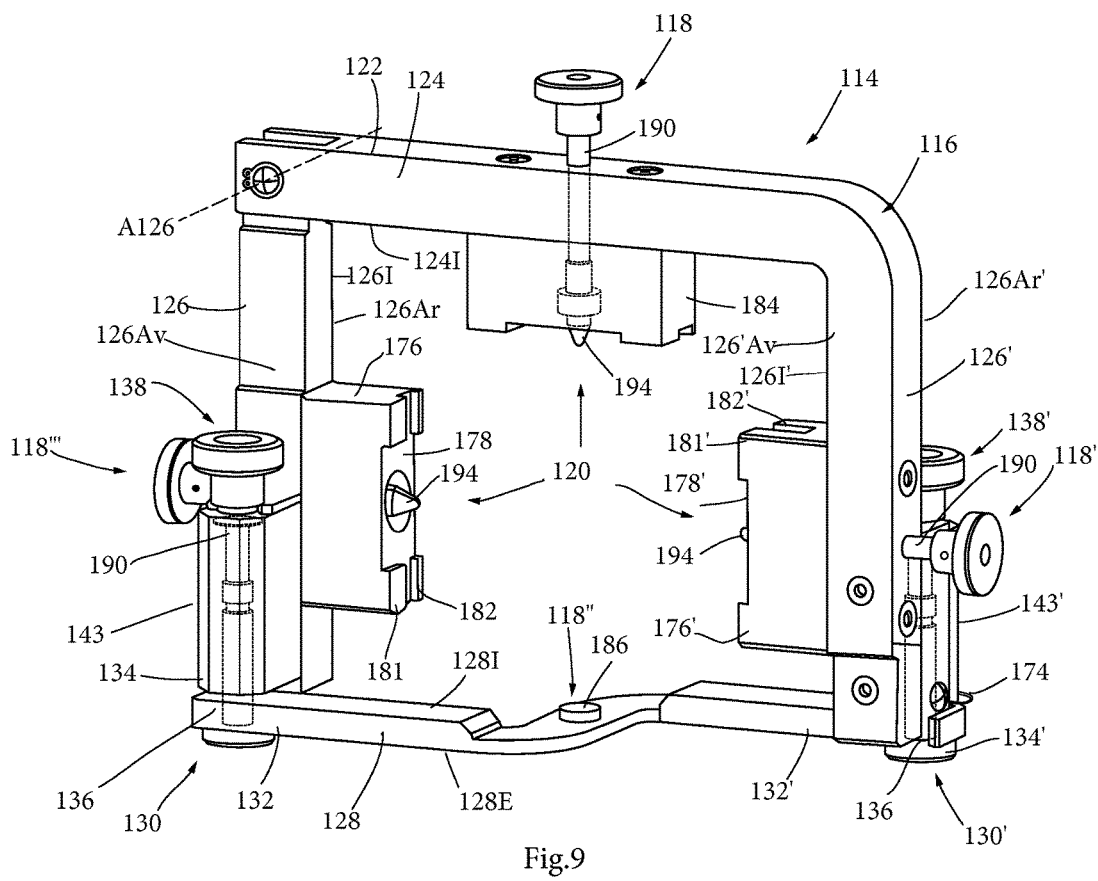
FIG. 9 is a perspective view of the tool illustrated in FIG. 6 without a circuit element.
Figure 10:
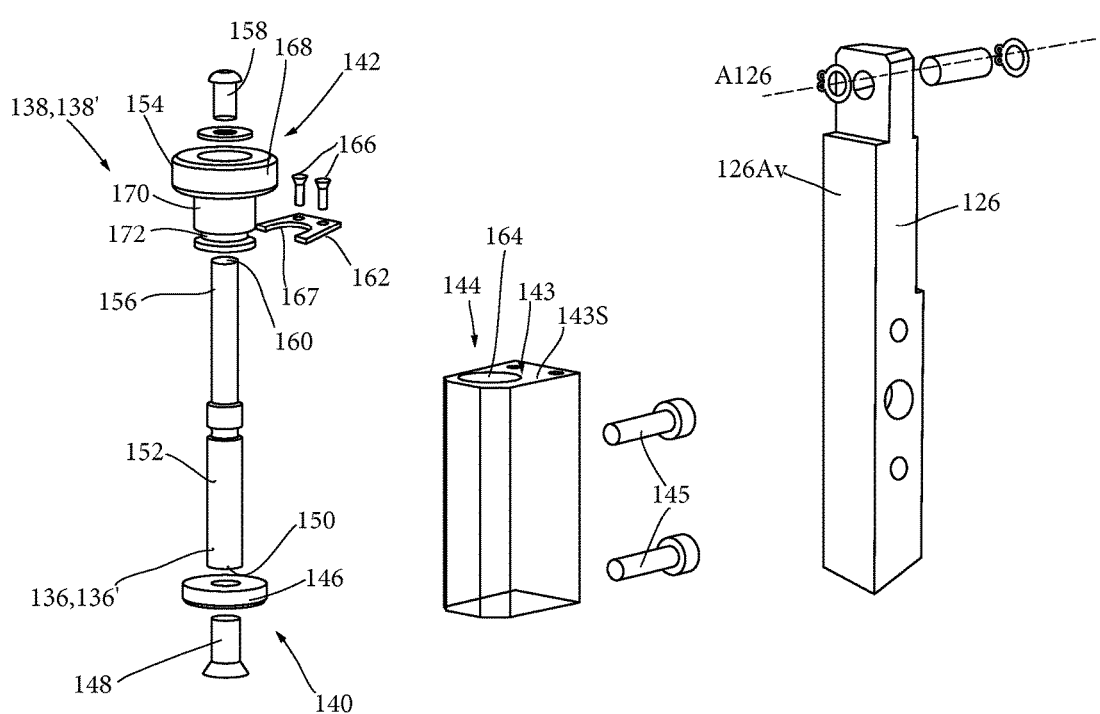
FIG. 10 is a perspective view illustrating in a detailed exploded view a part of the tool illustrated in FIG. 6.

According to one embodiment illustrated in FIGS. 9 and 10, each clamping system 138 comprises a stem 136 parallel to the arms and first and second stops 140, 142 provided at the ends of the stem, at least one of which is mobile in the direction of the stem 136.

According to this second variant, each arm 126 (126') supports a block 143 (143') which comprises a through hole 144 for accommodating the stem 136, which extends over the entire height of the block. Each block 143 or 143' is secured to the corresponding arm by screws 145 which pass through the arm. The block 143 is clamped against the front face 126Av of the arm 126 while the block 143' is clamped against the rear face 126av' of the arm 126'. Thus, according to this configuration, the rod 128 is in the shape of an S so as not to interfere with elements projecting from the fluid circuit element 110.

The first stop 140 comprises a retaining washer 146 mounted on the stem 136 and a screw 148 which is screwed into a tapped hole 150 created at a first end 152 of the stem 136. Once the frame is assembled, the retaining washer 146 bears against the external surface 128E of the rod 128.

The second stop 142 comprises a knurled knob 154 with a smooth hole through which passes a second end 156 of the stem 136. Once the frame is assembled, the knurled knob 154 bears directly or indirectly against the upper face 143S of the block 143.

The clamping system 138, 138' comprises a screw 158 which is screwed into a tapped hole 160 created at the second end 156 of the stem 136.

According to this configuration, screwing or unscrewing the screw 158 and/or the screw 148 tightens and loosens the clamping system 138, 138'.

Advantageously, each block 143, 143' comprises at least one centering shim 162 for positioning and holding the knurled knob 154.

According to one embodiment, the through hole 144 comprises, in its upper part, a spot-facing 164.

The centering shim 162 is attached by two screws 166 to the upper face 143S of the block and comprises a U-shaped notch 167 oriented in the longitudinal direction. In addition, the knurled knob 154 comprises two stepped cylinders, an upper cylinder 168 with a knurled peripheral surface and a lower cylinder 170 with a diameter smaller than that of the upper cylinder 168. The lower cylinder 170 comprises a peripheral channel 172. According to this arrangement, the width of the U-shaped notch 167 is greater than the diameter of the base of the peripheral channel 172 and smaller than the diameter of the lower cylinder 170. Thus, for each knurled knob 154, the edges of the U-shaped notch 167 are accommodated in the peripheral channel 172 of the knurled knob 154 and are thus held.

Advantageously, the tool comprises a connector 174 which provides a permanent connection between the rod 128 and the stirrup 122 even when the connections 130, 130' no longer connect the rod 128 to the stirrup 122. This connector 174 comprises a cable with at each of its ends an eye. Each eye is secured by a screw respectively to the stirrup 122 and to the rod 128.

The positioning structure 120 for positioning and immobilizing the frame 116 immobilize the frame 116 with respect to the fluid circuit element 110 in a transverse plane. Advantageously, in addition to immobilizing the frame in a transverse plane, the positioning structure 120 for positioning and immobilizing the frame immobilize the frame 116 with respect to the fluid element 110 in the longitudinal direction.

According to one embodiment, each arm 126, 126' comprises a centering wedge 176, 176' attached to its internal face 126I, 126I'.

Each centering wedge 176, 176' comprises a bearing surface 178, 178', the bearing surfaces 178, 178' being simultaneously in contact with the fluid circuit element 110 so as to immobilize the latter in a first direction, corresponding in the figures to the horizontal direction. To that end, the distance between the bearing surfaces 178, 178' is substantially equal to the dimension of that part of the fluid circuit element 110 in contact with the bearing surfaces 178, 178', in a direction parallel to the base of the frame.

Advantageously, each bearing surface 178 (178') comprises two ribs 181 (181') and 182 (182') which project with respect to the bearing surface 178 (178') and are oriented in the direction parallel to the length of the arms 126, 126', the ribs 181 (181'), 182 (182') being separated by a distance making it possible to immobilize the frame with respect to the fluid circuit element in the longitudinal direction. To that end, the distance between the ribs 181 (181'), 182 (182') is substantially equal to the dimension of that part of the fluid element in contact with the bearing surface 178, 178', in the longitudinal direction.

According to one embodiment, the ribs 181 (181') and 182 (182') are discontinuous and leave the central part of the bearing surfaces 178 (178') free.

Advantageously, the centering wedges 176, 176' are positioned with respect to the arms 126, 126' such that the bearing surfaces 178, 178' bear all around the openings 112' and 112'''.

The positioning structure 120 for positioning and immobilizing the frame 116 in one aspect comprise, in addition to the centering wedges 176, 176', a bearing wedge 184 attached to the internal face 124I of the base 124 of the stirrup 122.

According to this second variant, the bearing wedge 184 is identical to the centering wedges 176, 176'.

The bearing wedge 184 in one aspect is positioned with respect to the base 124 such that its bearing surface bears all around the opening 112.

Advantageously, the centering wedges 176, 176' and the bearing wedge 184 are made of a material which limits the risk of damage to the fluid circuit element 110. According to one embodiment, the wedges 176, 176' and 184 are made of polyacetal.

In the case of a fluid circuit element 110 comprising four openings 112, 112', 112" and 112''' distributed according to the arrangement described previously and illustrated in FIG. 7, the tool 114 comprises four sealing devices 118, 118', 118" and 118''' by which it is possible to seal, respectively, the openings 112, 112', 112" and 112''', and which are supported respectively by the base 124, the second arm 126', the rod 128 and the first arm 126.

According to one embodiment, the sealing device 118" comprises a seal 186 whose cross section matches that of the opening 112" and which is secured to the rod 128.

According to one embodiment, the seal 186 is adhesively bonded to the rod 128.

The sealing devices 118, 118' and 118''' are identical to the sealing device 18 described in detail in FIG. 5A. Each comprises a threaded stem 190 which supports a seal 194.

For the sealing device 118, the base 124 comprises a tapped hole and the bearing wedge 184 comprises a through hole.

For the sealing device 118', the second arm 126' comprises a tapped hole and the centering wedge 176' comprises a through hole.

For the sealing device 118''', the first arm 126 comprises a tapped hole and the centering wedge 176 comprises a through hole.

The operation of the tool 114 is described with reference to FIGS. 6 and 8.

In a first instance, the stirrup 122 is placed on the fluid circuit element 110. It is possible to move the first arm 126 aside in order to facilitate this placement. The shapes of the wedges 176' and 184 facilitate the positioning of the stirrup 122 in the longitudinal direction.

Then, the wedge 176 is placed in contact against the fluid circuit element 110 by pivoting the first arm. The rod 128 is mounted and connected to the ends of the arms 126 and 126'.

Then, the clamping systems 138, 138' are tightened such that the frame 116 is immobilized with respect to the fluid circuit element 110 and such that the seal 186 correctly seals the opening 112". The two clamping systems 138, 138' in one aspect are tightened simultaneously.

Finally, by screwing the threaded stems of the sealing devices 118, 118' and 118''', the seals 194 are clamped against the perimeter of the openings 112, 112' and 112''' so as to seal them.

Since the openings 112, 112', 112''' are of relatively small cross section, the compressive force on the seals 186, 194 necessary to obtain a satisfactory seal is relatively small.

The disclosure also relates to a method for sealing at least one opening of a fluid circuit element using a tool in accordance with the disclosure.

While at least one exemplary embodiment of the present disclosure has been shown and described, it should be understood that modifications, substitutions and alternatives may be apparent to one of ordinary skill in the art and can be made without departing from the scope of the disclosure described herein. This application is intended to cover any adaptations or variations of the specific embodiments discussed herein. In addition, in this disclosure, the terms "comprise" or "comprising" do not exclude other elements or steps, and the terms "a" or "one" do not exclude a plural number. Furthermore, characteristics or steps which have been described with reference to one of the above exemplary embodiments may also be used in combination with other characteristics or steps of other exemplary embodiments described above.

The invention claimed is:

1. A tool for sealing at least one opening of a fluid circuit element, the tool comprising:
   a support frame with at least one removable part to allow the frame to be placed around the fluid circuit element;
   at least one sealing device for sealing an opening of the fluid circuit element when connected to the support frame; and
   a positioning structure for positioning and immobilizing the support frame with respect to the fluid circuit element,
   wherein the opening of the fluid circuit element is transverse to a longitudinal direction of the fluid circuit element,
   wherein the support frame comprises
      a U-shaped stirrup with a base portion and two arms, the arms having a base end and a free end,
      a rod having a support side and an outer side, and
      two connections connecting the rod to the free end of each arm,
   wherein the positioning structure comprises a centering wedge attached to a support surface of each arm, the support surfaces being spaced apart by a distance making it possible to immobilize the fluid circuit element in a direction transverse to a longitudinal direction of the fluid circuit element.

2. The tool according to claim 1, wherein at least one of the two arms is articulated with respect to the base portion.

3. The tool according to claim 1, wherein, for each centering wedge, the support surface of each arm is extended by an inclined edge face, the inclined edge face forming a shape which widens towards the free end of the arm.

4. The tool according to claim 1, wherein the support surface of each arm comprises two ribs which project with respect to the support surface and are oriented in a direction parallel to a length of the arms, the ribs being separated by a distance making it possible to immobilize the fluid circuit element in a longitudinal direction of the fluid circuit element.

5. The tool according claim 1, comprising a bearing wedge attached to a support face of the base portion.

6. The tool according to claim 1, wherein the rod comprises a seal for sealing an opening in the fluid circuit element.

7. The tool according to claim 1, wherein the tool comprises a connector which provides a fixed connection between the rod and the U-shaped stirrup.

8. The tool according to claim 1, wherein, for each sealing device, the frame comprises a through hole whose axis is aligned with that of an opening in the fluid circuit element when the tool is mounted on the fluid circuit element.

9. The tool according to claim 8, wherein the sealing device comprises
- a threaded stem which is screwed into a tapped through hole in the frame,
- a seal, and
- a support interposed between the threaded stem and the seal, the seal being attached to the support, the support being able to pivot with respect to the threaded stem.

10. The tool according to claim 1, comprising at least one clamping system which brings the rod closer to the base portion.

11. The tool according to claim 10, comprising two clamping systems provided at each end of the rod.

12. The tool according to claim 10, wherein the clamping system comprises a stem which extends in a direction parallel to a length of the arms, with a first stop which bears against the outer side of the rod and a second stop which bears against a portion of the frame or an element secured to the frame, at least one of the first and second stops being mobile in the direction parallel to the length of the arms.

* * * * *